March 24, 1970          E. REISS          3,502,533
METHOD OF MAKING A VENEER SURFACING SHEET MATERIAL
Filed Jan. 18, 1966
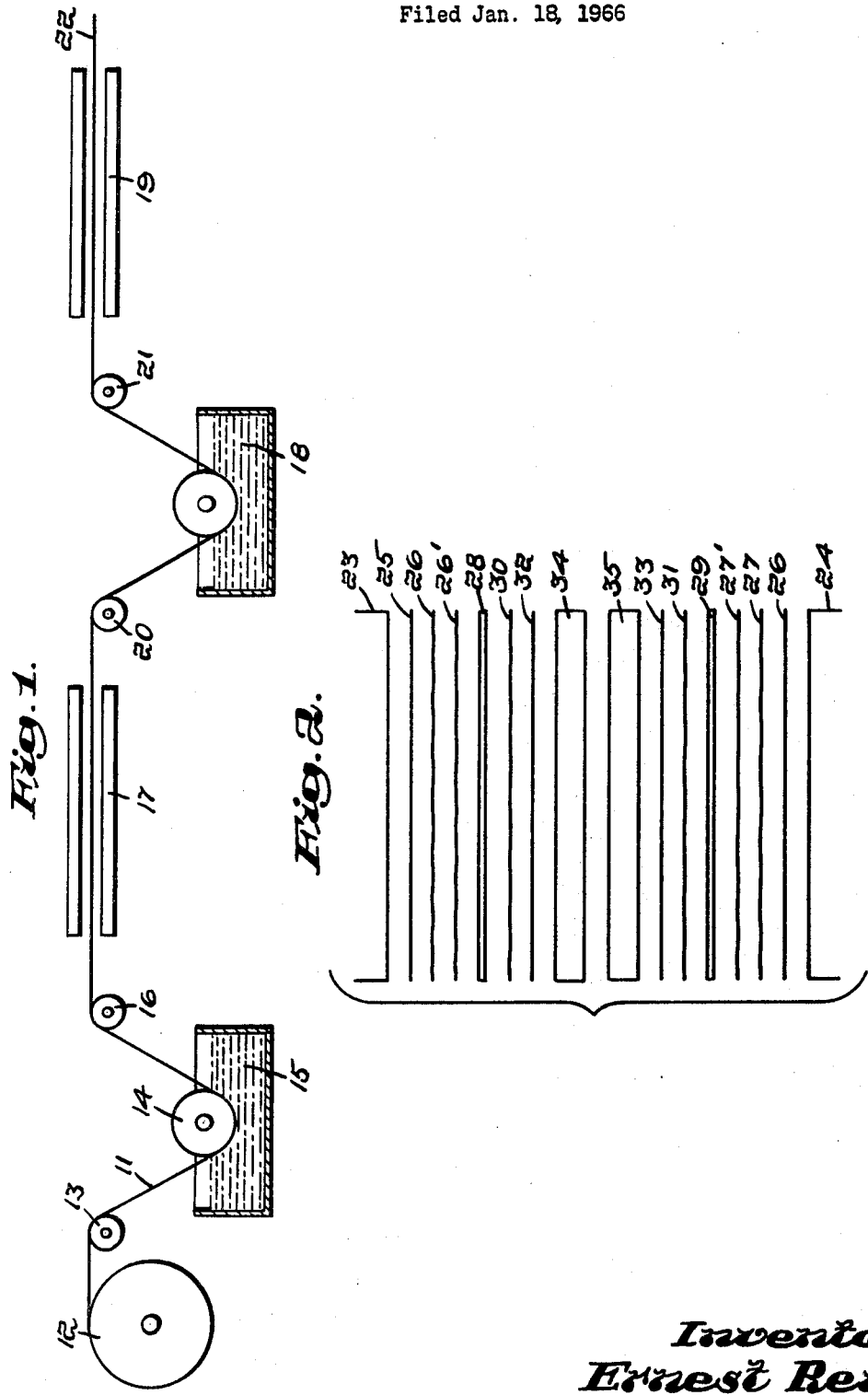
Inventor:
Ernest Reiss,
by Andrew D. Thomsen
Attorney

United States Patent Office 3,502,533
Patented Mar. 24, 1970

3,502,533
METHOD OF MAKING A VENEER SURFACING SHEET MATERIAL
Ernest Reiss, 37 Woodbine Road,
Belmont, Mass. 02178
Filed Jan. 18, 1966, Ser. No. 521,266
Int. Cl. C09j 5/04
U.S. Cl. 156—315
5 Claims

ABSTRACT OF THE DISCLOSURE

A melamine sheet material which does not require a balancer sheet to prevent shrinkage and warping when laminated with a substrate, is prepared by coating with alkylated melamine formaldehyde resin, partial curing, coating with a conventional melamine formaldehyde resin and heating to complete the curing of the first coat but only partially curing the second coat. Curing is completed when laminating the sheet with a substrate.

BACKGROUND AND BRIEF DESCRIPTION OF THE INVENTION

This invention relates to the manufacture of veneer-like, decorative surfacing sheet materials which may be laminated to plywood or other substrates, and more particularly to sheet materials impregnated with thermosetting plastics such as melamine.

The use of melamine impregnated decorative sheet materials such as paper or fabric, as a facing material for plywood and other substrates is well known. According to the usual method of manufacture the paper is impregnated by running it through a bath of liquid resin. The resin is then dried, or partially cured to what is known as the "B" stage. In that condition the resin is non-tacky at room temperature but becomes adhesive when activated by heat. The impregnated sheet is finally laminated to the substrate in a heated press and the resin is cured to the "C" stage or fully polymerized condition. When fully cured, melamine resin is hard and highly resistant to heat and stains. A durable, decorative surface is thus formed on the completed panel.

Because of the tendency of the resin to shrink under heat during the laminating process, it is customary to laminate a balancer sheet of the same impregnated material to the under surface of the substrate to keep the finished panel from warping.

The principal object of this invention is to provide a resin impregnated sheet material which does not shrink appreciably during the laminating process, so that high grade panels may be produced without using a balancer sheet. Another object is to provide a simple and inexpensive method of making such a sheet. Other objects, advantages, and novel features of the invention will be apparent from the following description.

The impregnated sheet here disclosed is produced as follows:

A sheet of paper, fabric, or other material commonly used for veneers of this type is first impregnated with resin by running it through a resin bath of relatively low resin solids. The bath is adjusted so that only enough resin is picked up to seal the pores of the paper, and flow is negligible. The sheet is dried under enough heat to cure the resin to the "B" stage, and next run through another bath of higher resin content and higher flowability. The sheet is then dried under enough heat to cure the resin in the interior of the sheet, picked up in the first bath, to the "C" stage, and to cure the exterior cotaing picked up in the second bath to the "B" stage.

The finished veneer sheet has an interior content of fully polymerized resin, which is hardened and resists further shrinkage of the sheet under heat, and an exterior coating of partially cured resin. The sheet is self adhesive under heat and can be laminated to plywood or other materials in the usual manner, but does not shrink appreciably in the laminating process.

The improved method is illustrated diagrammatically by the accompanying drawings in which:

FIG. 1 shows a two-stage process for impregnating and preshrinking the sheet material; and FIG. 2 indicates a recommended method of laminating a pair of surfacing sheets to a pair of substrates in one pressing operation.

To make a veneer sheet according to the invention a sheet 11 of suitable material, such as a 65 lb. absorbent alpha-cellulose paper, similar to blotting paper, which may be of any desired color or may be printed with a wood grain or any desired design, is fed from a roll 12 over guide rollers 13 and 14 through a first impregnating bath 15 of relatively low resin content. A suitable material for the first impregnating stage is an alkylated melamine formed by reaction of alcohol with melamine and formaldehyde. A water solution of about 18 to 22 percent by weight resin solids is used. The melamine pick up is adjusted so that the resin content of the paper is about 20 percent, and there is no measurable flow.

The impregnated sheet is passed over roll 16 through a heating chamber 17 in which the resin is dried and cured to the "B" stage, and the sheet partially shrunk. The sheet in this condition may be stored and put through the second impregnating operation later, or may pass directly over roller 20 to a second impregnating bath 18.

The second bath may be a solution of water and/or alcohol soluble melamine formaldehyde resin, which may contain catalyzers to vary the cure rate. The second bath has a resin solids of about 46 to 49 percent by weight and is adjusted so that the resin pickup of the sheet is 20 to 45 percent with a flow of 1 to 12 percent. The resin content is varied according to the laminating pressure which is to be used for bonding the sheet to the substrate. Less resin content is required for high pressure laminating than for low pressure laminating.

After the second impregnating step, the sheet passes over guide roll 21 to a second heat chamber 19, where the resin applied in the second bath is cured to the "B" stage and the resin pick up in the first bath is further cured to the "C" stage, or fully polymerized condition. The sheet is further shrunk in the second heating operation.

The finished veneer sheet 22 contains about 20 percent of resin from the first stage which is in fully cured condition, and because of its low flowability has been retained in the pores of the paper. This resin will not shrink further under heat and resists shrinkage of the sheet. The sheet also carries 20 to 45 percent of resin from the second stage which is only partially cured. This resin is flowable and adhesive, when again activated by heat, so that the sheet can be subsequently laminated to a substrate.

In its finished condition the sheet may be stored until required for use in laminating. The sheet may be laminated to any of the usual substrate materials such as plywood, particle board, chipboard, flakeboard, hardboard, or metal. When the sheet is laminated to metal a suitable adhesive should be applied to its under surface. The sheet may be laminated at pressures from 200 p.s.i. to 1000 p.s.i. and at temperatures from 250° F. to 325° F. In general the pressure used is determined by the available press capacity and the amount of pressure the substrate will withstand.

In the laminating step the sheet is retained in the hot press long enough to fully polymerize the remaining resin, for example about 15 minutes at 260° to 300° F. The finished veneer surface is highly resistant to stains, crazing, heat, and abrasion. The veneered panels may be used for many purposes such as tables and counter tops, doors, walls, and furniture.

The principal advantage of the sheet is that it does not shrink during the laminating process, so that warp-free panels may be produced without the use of a balancer sheet. It is understood, however, that a second veneer sheet may be laminated to the under surface of the substrate if a double-faced panel is desired.

Another advantage of the sheet is that two panels can be laminated back to back in the same press.

FIG. 2 diagrammaticaly indicates the elements placed in such a press for producing two divisible laminates with two substrates in one operation. In said figure, 23 and 24 represent the top and bottom platens of the press; 25 and 26 represent the top and bottom cover plates; 26, 26' and 27, 27' represent dry kraft cushioning sheets, at top and bottom; 28 and 29 represent stainless steel plates; 30 and 31 represent waxed paper sheets; 32 and 33 represent the impregnated and preshrunk veneer sheets, as aforesaid; and 34 and 35 represent a pair of abutting substrates of plywood or the like.

Two substrate panels and vener sheets, arranged in a press as illustrated in FIG. 2, can be bonded and cured at the same time, thus doubling the production of the press.

Another advantage of the new veneer sheet is that it eliminates the need of an overlay sheet. In laminating sheets impregnated by previous processes, in which all the resin is only partially cured, the resin tends to migrate through the sheet into the substrate and too little resin is left on the outer surface to produce a good finish. To overcome this problem it is customary to use an overlay sheet, of transparent paper, which is also resin impregnated. In the new sheet, the fully cured resin, which seals the pores of the paper, acts as a barrier so that all the partially cured resin on the outer surface remains there during the laminating process. A dense protective coating is thus formed. By suitable choice of the press plates any desired finish such as gloss, satin, or textured, may be formed on the outer surface of the veneer.

I claim:
1. The method of making an alkylated resin impregnated veneer sheet which comprises the following steps:
   (1) impregnating a thin sheet of material with a thermosetting alkylated melamine formaldehyde resin,
   (2) heating the impregnated sheet to dry and partially cure the resin therein,
   (3) applying thermosetting melamine formaldehyde resin to the sheet, and
   (4) again heating the sheet to fully polymerize the resin applied in the first step and partially cure the resin applied in the third step.

2. The method described in claim 1, the resin being applied in the first and third steps by passing the sheet through liquid resin baths.

3. The method described in claim 2, the bath for the first step being a solution of from 18 to 20 percent by weight of alkylated melamine formaldehyde, and the bath for the third step being a solution of from 46 to 49 percent by weight melamine formaldehyde.

4. The method described in claim 3, the resin applied in the first step having negligible flow, and the resin applied in the third step having a flow of from 1 to 12 standard.

5. The method of making a veneered panel which comprises the following steps:
   (1) impregnating a thin sheet of material with a thermosetting alkylated melamine formaldehyde resin,
   (2) heating the impregnated sheet to dry and partially cure the resin therein,
   (3) applying thermosetting melamine formaldehyde resin to the sheet,
   (4) again heating the sheet to fully polymerize the resin applied in the first step and partially cure the resin applied in the third step, and
   (5) laminating the sheet under heat and pressure to a substrate and fully polymerizing the resin applied in the third step.

References Cited

Robert W. Martin, The Chemistry of Phenolic Resins, John Wiley & Sons, New York (1956), pp. 234–235.

JOHN T. GOOLKASIAN, Primary Examiner

R. A. KILLWORTH, Assistant Examiner

U.S. Cl. X.R.

117—76; 156—331; 161—258, 261, 263; 260—29.4